Oct. 3, 1961 A. S. MYERS, JR 3,003,141

RING CIRCUITS

Filed Feb. 18, 1959 2 Sheets-Sheet 1

INVENTOR.
AURIE S. MYERS JR.

BY

*Arthur S. Tenser*

ATTORNEY

Oct. 3, 1961 A. S. MYERS, JR 3,003,141

RING CIRCUITS

Filed Feb. 18, 1959 2 Sheets-Sheet 2

United States Patent Office 3,003,141
Patented Oct. 3, 1961

3,003,141

RING CIRCUITS

Aurie S. Myers, Jr., Poughkeepsie, N.Y., assignor to International Business Machines Corporation, New York, N.Y., a corporation of New York Filed Feb. 18, 1959, Ser. No. 794,169
11 Claims. (Cl. 340—174)

This invention relates to ring circuits, and more particularly to such circuits employing solid state electronic components as the principal elements thereof.

In patent application Serial Number 794,135 for Self Propagating Core Logic Circuits and Serial Number 794,078 for Pulse Counters, of Aurie S. Myers, Jr., filed concurrently herewith, various circuits utilizing transistors and square loop magnetic cores are shown and described. The circuits of the present invention comprise the same basic elements and while not limited thereto, are suitable for use with them.

Shift rings or registers are important parts of modern computer systems. These units are essential to the performance of arithmetic functions by the system and also provide temporary storage means within the machine. By providing suitable output connections, these rings may also provide a series of timing pulses for synchronizing succeeding operations of the computer. It is therefore advantageous to the operation of the entire computer, to provide ring circuits which are versatile and reliable in operation.

As discussed in the above-mentioned patent applications, the combination of the transistor and the square loop magnetic core provides circuit advantages not heretofore realized with other components. The present invention makes use of these desirable characteristics to provide novel ring circuits having capabilities heretofore unrealized.

Accordingly, it is a principal object of this invention to provide a novel shift ring or register.

Another object of this invention is to provide a ring circuit capable of functioning both as a timing ring and as a shift register.

A further object of this invention is to provide such a ring circuit capable of bidirectional operation.

Still another object of this invention is to provide a novel ring circuit employing transistors and magnetic cores as the principal components thereof.

More specifically, the instant invention comprises a plurality of core-transistor stages, each capable of storing a pulse signal applied thereto, and two sources of pulses for driving alternate stages. This provides what is termed a two-stage per bit shift register. In addition, a pulse output may be derived from each stage in succession to provide a timing or counting function.

Each stage of the basic ring comprises an input magnetic core, a transistor amplifier actuated by the output energy developed by the core, and a pair of output cores driven by the amplifier. A pulse supplied to the input core turns on the amplifier which in turn sets or switches both of the output cores. An output pulse is derived from one of the output cores during this time. At the conclusion of the input pulse, the input core and one of the output cores is reset to its original condition, with the second output core being maintained in its switched state. The second output core is switched back to its original condition by application thereto of a pulse from one of the drive sources, which may be termed the "A" driver. The output pulse developed during this switching is applied as the input to the succeeding stage. The cycle of operation is then repeated, except that the second output core of the succeeding stage is switched to its initial condition by a pulse from a second source, termed the "B" driver. This double cycle of operation then repeats itself for the number of pairs of stages desired. As will be seen, this arrangement may operate as a shift register or timing ring.

The basic transfer stage may also be modified to function bi-directionally by the addition of another core element to each stage and suitable sources of "shift left" and "shift right" signals.

The particular arrangements of cores and transistors described hereinafter produce decided advantages over ring circuits presently known. The transistor amplifier present in each stage of the invention enables each stage to provide a powered output without the necessity of having a central high power drive source. This permits each of the stages to efficiently drive a plurality of other circuits. Moreover, by providing a separate core for deriving the powered output, the load driven thereby is effectively isolated from the input circuits and will not affect their responses. In addition, the use of cores and transistors provide a simple circuit arrangement not heretofore attainable. All these advantages obtain in addition to those, such as small size, long life, and low power dissipation inherent in the solid state devices themselves.

Other objects of the invention will be pointed out in the following description and claims and illustrated in the accompanying drawings, which disclose, by way of example, the principle of the invention and the best mode, which has been contemplated, of applying that principle.

In the description to follow, it is to be understood that each of the magnetic cores is of the square hysteresis loop variety, thereby exhibiting two stable states of substantial magnetic remanence. In other respects, these cores and their associated windings function as ordinary transformers; a change in flux induced in the core by a current change in a primary winding will induce a current in a secondary winding. Thus, if a core is initially saturated in one direction, thereby assuming one of its stable states, a current through its input or primary winding in the proper direction and of sufficient magnitude will cause it to switch or shift to its other stable condition of saturation. During this switching, a current will be induced in output or secondary windings coupled to the core. In binary terminology, one of these stable conditions is labeled the "0" state and the other the "1" state. If a core is said to have been switched from a "0" to a "1," it has been switched from one condition of saturation to another. It is believed that the operation of square loop cores will be well known to those skilled in the art, and further discussion thereof is deemed unnecessary.

FIG. 1

Figure 1:
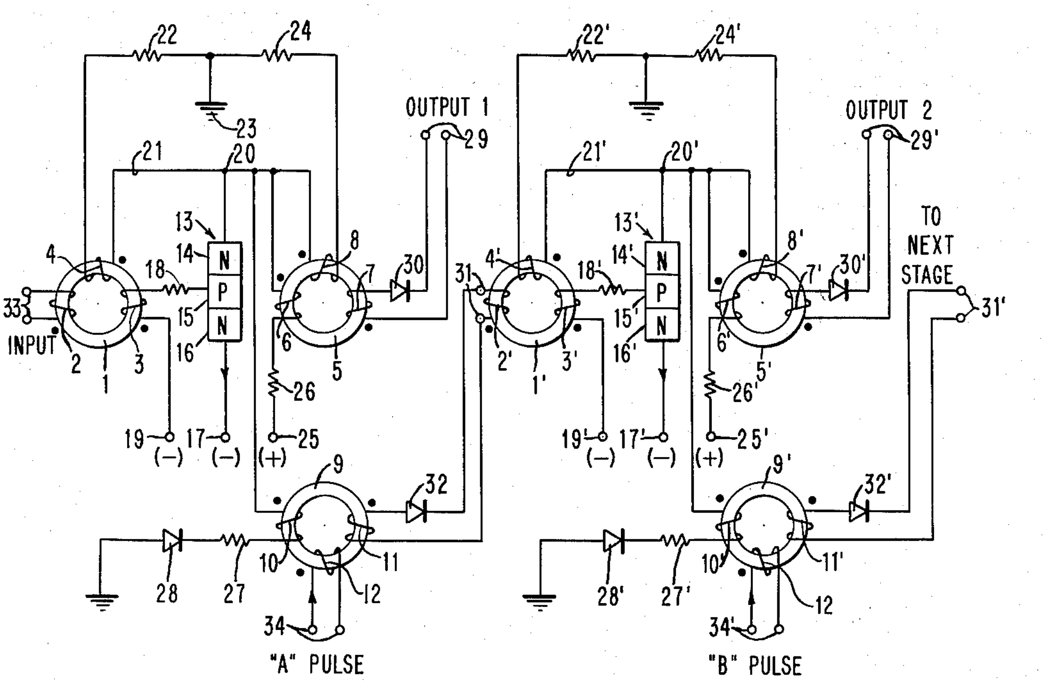
FIG. 1 is a schematic diagram of a pair of stages forming the basic unit of the invention.

Referring now to FIG. 1, the basic two stage unit is shown. Core 1 has input winding 2, output winding 3 and additional winding 4 coupled thereto. The dots shown indicate terminals of like polarity, in accordance with standard transformer notation. Similarly, core 5 has input, output and additional windings, 6, 7 and 8 respectively, and core 9 has input, output and additional windings 10, 11 and 12, respectively. Transistor 13 is shown as being of the NPN junction type having collector 14, base 15 and emitter 16. It is to be understood that any suitable type of transistor may be used to provide the desired amplification. Emitter 16 of the transistor is tied to the negative terminal 17 of a source of potential and base 15 is connected through current limiting resistor 18 to one terminal of winding 3. The other terminal of winding 3 is connected to negative terminal 19 of a source of potential. Terminal 19 is made slightly more negative than terminal 17 so that in the absence of an induced voltage in winding 3, base 15 is more negative than emitter 16 and transistor 13 is maintained in a non-conductive condition. The collector 14 of transistor 13 is tied to junction point 20 on conductor 21.

One end of conductor 21 is connected to one end of winding 4 on core 1, the other end of which is returned through limiting resistor 22, to reference potential 23. The other end of conductor 21 is similarly connected through winding 8 on core 5 and through limiting resistor 24 to reference potential. Positive terminal 25 of a source of potential is coupled through resistor 26 and winding 6 on core 5 to conductor 21. This source provides collector potential for the transistor 13 and performs an additional function, as will be fully described hereinafter. Also connected to conductor 21 is one terminal of winding 10 of core 9, the other end of which is tied through the series combination of resistor 27 and diode 28 to reference potential. Output winding 7 of core 5 is connected to output terminals 29 with diode 30 interposed in one of the connections. Similarly, winding 11 of core 9 is connected to output terminals 31 through diode 32. Input to the circuit is applied at terminals 33 connected to winding 2 of core 5. The "A" driving pulses, which may be generated, for example, by a multivibrator, are applied to terminals 34 which are connected to winding 12 of core 9.

The second stage of the circuit is an exact duplicate of the first stage described above and primed (′) reference numerals are used to indicate the similar elements thereof. The output present at terminals 31 is applied as the input to the second stage and "B" driver pulses, from any suitable source, are applied to the terminals 34′.

OPERATION OF FIG. 1

In discussing the operation of this circuit, it is to be understood that the second stage will operate in a fashion identical to that of the first stage and individual elements will function in the same manner. Accordingly, the detailed description will be limited to the first stage.

Prior to receipt of an input signal, cores 1, 5 and 9 are in their initial or "0" state of saturation and transistor 13 is non-conducting. During this time, current is flowing from source 25, through resistor 26 and winding 6 of core 5 to conductor 21, where it divides into two parallel paths. One of these paths is through winding 4 of core 1 and resistor 22 to reference potential; the other is through winding 8 of core 5 and resistor 24 to reference potential. This unidirectional current flow through winding 4 tends to maintain, or bias, the core 1 in its "0" state. Similarly, the current flow through winding 8 maintains core 5 at a "0." As is apparent from the relative polarities of windings 6 and 8, the current flow through winding 6 is in such direction as to tend to switch core 5 to a "1." To counteract this effect, winding 8 is made with sufficiently more turns than winding 6 such that the net ampere turns of flux produced in core 5 by this current flow will tend to maintain the core at a "0." Current from source 25 does not flow through winding 10 of core 9 because of the blocking action of diode 28.

The pulses applied to the input of each stage are arranged to be of such polarity as to produce a current flow through the respective input windings which will switch the associated cores to "1" states. In addition, these pulses must be of sufficient magnitude to overcome the bias effect of the additional windings just described. It can be seen therefore, that the bias level provides a means to discriminate against noise and other spurious pulses. Assuming a proper input pulse is applied to terminals 33, core 1 starts to switch to a "1." As the core switches, a potential is induced across winding 3 which is of such polarity as to render base 15 of the transistor positive with respect to its emitter 16. When the base-emitter junction becomes forward biased, transistor 13 goes into conduction. As the transistor goes into conduction, its collector 14 drops in potential towards the negative voltage at source 17. Thus point 20 on conductor 21, becomes negative with respect to reference potential.

The drop in potential assumed at point 20 results in changes in current flow in four different circuit paths. Considering core 1, current which initially flowed from source 25, through winding 4 towards reference potential, reverses in direction and now flows from reference potential towards the more negative potential at point 20 and then through transistor 13 to source 17. This reverses the effect of winding 4 on core 1 and it now assists in switching the core to a "1." This in turn increases the potential induced across winding 3 which drives base 15 more positive. Transistor 13 is thereby quickly driven into saturation and effectively becomes a short circuit between point 20 and negative potential at 17. Thus, winding 4 regeneratively assists the input winding to switch the core and the switching speed is accelerated.

Conduction of transistor 13 also causes reversal of current flow through winding 8 of core 5 in the same manner as with winding 4. This winding now assists winding 6 in switching the core to a "1." Current flow from source 25 through winding 6 to point 20 continues but now goes through the transistor 13. This current flow through winding 6 is greater than during the non-conducting period of the transistor because of the amplifying effect of the device, and switching of core 5 is thereby rapidly accomplished. As core 5 switches to a "1," a potential is induced across output winding 7 and this is present at terminals 29. Diode 30 is so polarized as to permit current flow into a load connected at terminals 29 at this time.

Conduction of the transistor 13 also pulls current from reference potential, through diode 28, resistor 27 and winding 10 of core 9. This current flow sets core 9 to a "1." As can be seen by the location of the dot associated with winding 11, diode 32 is so poled with respect to the polarity of the potential induced in the winding that no current will flow in the circuit loop comprising winding 11 and input winding 2′ of the succeeding stage. Accordingly, no output appears at terminals 31 during switching of the core 9 to its "1" state. At the instant of termination of the input pulse then, cores 1, 5 and 9 are all in their "1" states, transistor 13 is conducting, and an output potential is present at terminals 29.

Upon termination of the input pulse, a voltage is no longer induced across winding 3 of core 1 and base 15 drops to the potential at 17. This back biases the base-emitter junction of the transistor and it ceases to conduct. Collector 14, and thus point 20, rises towards the positive potential at 25. When point 20 becomes more positive than reference potential, current flow through windings 4 and 8 reverses again and resumes its original direction. This current flow now acts to reset or switch cores 1 and 5 back to their original or "0" state. It can be seen that during this process, the winding 4 acts degeneratively on transistor 13, causing it to turn off more rapidly by reducing minority carrier storage delay. Shortly after the termination of the input pulse then, cores 1 and 5 are returned to "0," Diode 28, in series with winding 10 of core 9 blocks current flow therethrough, and core 9 remains in its "1" state.

At a time determined by the time delay desired, an "A" driving pulse is applied to winding 12 of core 9 via terminals 34. This pulse is so polarized as to reset the core to "0." This produces an output at terminals 31, since during the reset operation, diode 32 is poled to permit current flow. The pulse appearing at terminals 31 provides the input to the second stage of the unit and the entire operation above described repeats itself in the second stage. In the case of core 9', a pulse from a "B" driver source is used as a reset signal. The output produced at terminals 31' is used as the input to a succeeding "A" driven stage, and so on, for as many units as are necessary.

In actual computer applications, the input pulse supplied to the first stage of the ring may be obtained from various sources. For example, when the circuit is used as a timing ring, the input pulse may be from the machine's master clock source. For shift ring or register application, the input may be the result of a series of logical operations performed in the arithmetic unit of the machine. The "A" and "B" driving pulses may be generated by any suitable pulse generating source synchronized with the master clock to provide the proper time spacing. The outputs available at each stage, because of the amplification of the transistor, are each capable of driving a plurality of other circuits in the machine. Since these outputs are available whether the circuit is being used as a timing ring or shift register, both functions may be performed simultaneously.

FIG. 2

Figure 2:
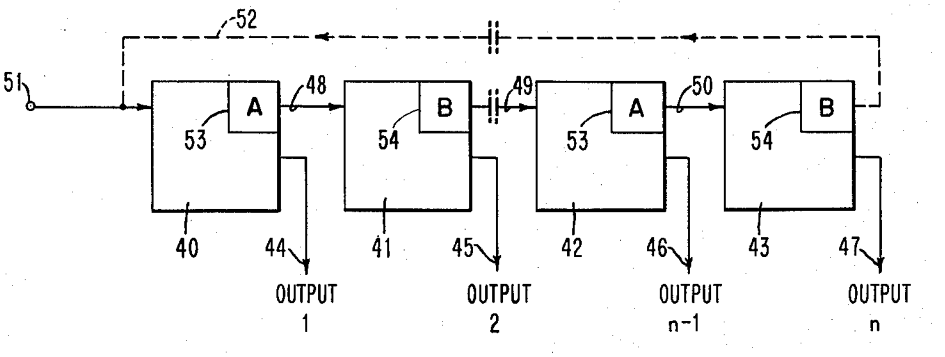
FIG. 2 is a block diagram illustrating how the stages of FIG. 1 may be interconnected to form a unidirectional timing or shift ring.

In FIG. 2, a block diagram, indicating the relative interconnection of a plurality of units of the type illustrated in FIG. 1, is shown. Each of the blocks 40 through 43 represent a single stage of the type illustrated in FIG. 1. Thus blocks 40 and 41 would represent one entire unit of FIG. 1 and blocks 42 and 43 another entire unit. As indicated by the broken lines, any desired number of units may be connected in cascade. For example, five such units would provide a ten pulse timing ring or a five digit shift register. In either case powered outputs are available from each stage at 44 through 47 respectively. Input to the circuit is applied at 51 and connections 48 through 50 represent the interconnections between the stages to provide the sequential operation. The squares in the upper right hand corner of each stage 40 through 43, legended alternately "A" and "B," represent the connection of an "A" or "B" driving source to the stage. A feedback connection 52 from the last stage to the input of the first stage may be provided to provide continuous operation once the circuit has been started.

In explaining the operation of this circuit let us first assume that all the cores in all the stages are in their "0" state. The stages may therefore be said to be in their "0" states or storing a "0." A first input pulse will cause the core of stage 40, which is equivalent to core 9 in FIG. 1, to switch to a "1," and the stage may therefore be said to be set to or storing a "1." At this time, an output will also be provided at 44. Upon application of the "A" pulse to stage 40, a pulse is supplied over connection 48 to stage 41, thereby setting it to "1" and providing the second output at 45. Stage 40 is returned to its "0" state by the "A" pulse. In all the other "A" driven stages, such as 42, the "A" pulse produces no effect since these stages were at "0."

Application of the "B" pulse now resets stage 41 to "0" and supplies an input pulse to the following "A" stage over connection 49. It may now be considered that the binary digit "1" has been transferred or shifted, to the next unit of the circuit. There have also been generated two timing pulses which serve to indicate whether the stage is at a "0" or "1" as well as providing a series of timed outputs. It is noted that if no pulse was being supplied at input 51 while the "B" driver was being applied no output would be available at 44 at this time. This condition obtains if the binary digit "0" is the second digit to be supplied to the register. It can be seen now, that the digit "1" will be shifted successively down the series of stages producing an output for each stage. If $n$ stages are provided to thereby obtain $n$ outputs, an $n/2$ digit shift register is available.

If it is desired to maintain the digits present in the ring or to provide a continuous series of timing pulses, feedback connection 52 may be provided. The $n$th stage 43 thereby transfers its stored digit to the first stage 40 and the entire operation repeats itself. Because of the self-powering feature achieved by the amplifier in each stage, this circulation may be continued indefinitely without the necessity of providing additional power from an external source. This adds greatly to the flexibility and utility of the circuit. The self-powering feature also enables the "A" and "B" driver sources to be relatively low power units since the output of each stage is powered by its self-contained amplifier.

FIG. 3

Figure 3:
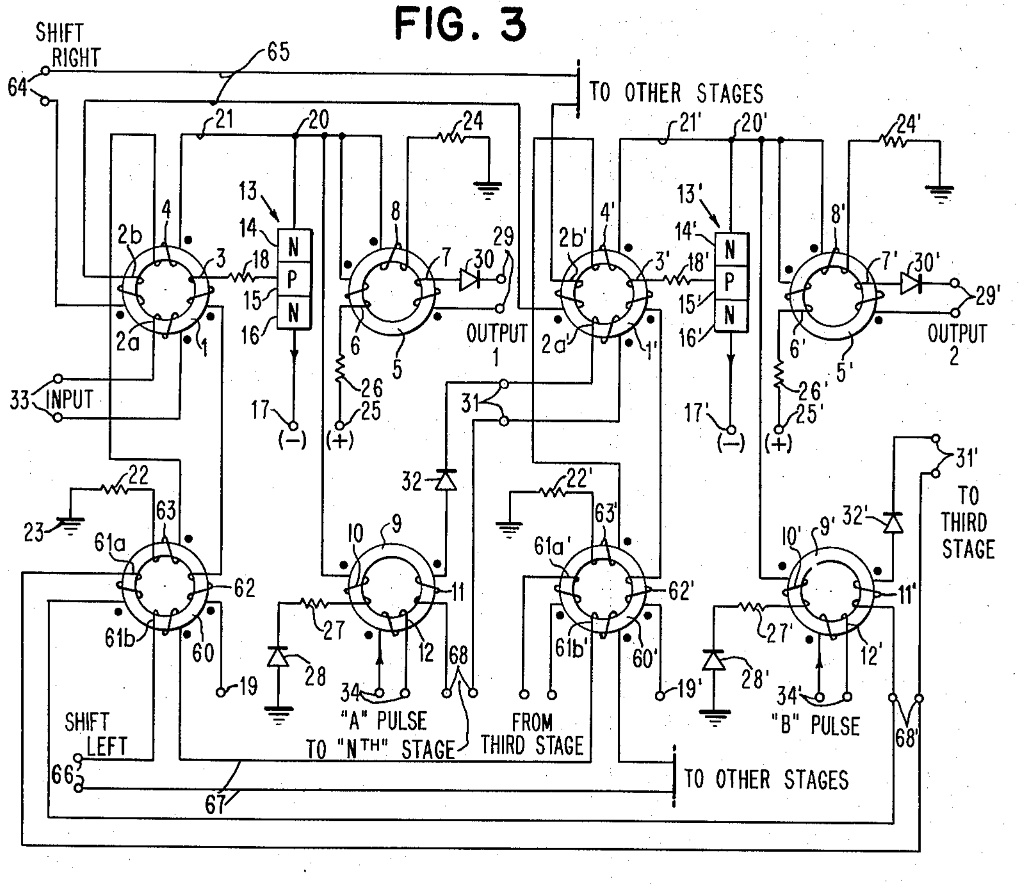
FIG. 3 is a schematic diagram of the two stage unit adapted for bidirectional operation.

In FIG. 3 is shown the basic unit of FIG. 1 adapted for bidirectional operation. As in FIG. 1, a pair of stages is shown, constituting one unit of the ring, and the same reference numerals are used for like elements. As can be seen, the bidirectional stage includes a complete basic stage plus an additional core and associated windings. There is also provided an additional input winding 2*b* on core 1, and input winding 2*a* is somewhat different from the winding 2 of FIG. 1, as will be explained hereinafter. Also, the output winding 11 of core 9 is branched to provide an input to two stages in series. In the case of the first stage of the ring, the additional input is supplied to the last or $n$th stage of the ring. Every other stage supplies this additional output to an input winding of the stage immediately to its left. Thus each stage provides an output to the stage immediately to its right and to its left with each operation.

The additional core 60 has input windings 61*a* and 61*b*, output winding 62, and additional winding 63 associated therewith. Winding 62 is connected in series with winding 3 of core 1 between base 15 and negative potential 19 and is oriented similarly to winding 3. Accordingly, a potential induced in either of windings 62 or 3 by switching of its respective cores will render transistor 13 conductive.

The winding 2*b* of core 1 is connected to a source of "Shift Right" potential which is coupled to form a series loop having the similar windings of each stage of the ring as elements thereof. The shift right potential may be from a constantly operating D.C. source or a properly timed pulse source. In like manner, a similar "Shift Left" source is coupled to winding 61*b* of core 60 and all the similar windings of the rest of the stages. These shift sources function to select the direction of propagation of a pulse in the ring. The input windings 2*a* and 61*a* have one half the number of turns of the winding 2 in FIG. 1, whereby an input signal of the same magnitude is insufficient to switch the cores. Windings 2*b* and 61*b* similarly have one half the number of windings of winding 2 in FIG. 1 and the magnitude of the shift signals applied thereto are chosen so that they will not of themselves switch the cores. However, coincident application of both a shift signal and an input signal to the core 1 or 60 will be sufficient to switch the core. It may be considered then, that the shift signal conditions one or the other of the cores so that upon application of an input signal, the stage will transfer the signal in the conditioned direction. It is to be understood of course, that only one shift source may be operative at any given time.

OPERATION OF FIG. 3

The shift right operation of the circuit of FIG. 3 will be described first. Assume that a pulse, such as from the arithmetic unit of the computer or from the master clock source is applied at terminals 33. Also assume that it is desired to shift the pulse to the right along the ring. This choice may result for example, from the program being followed by the machine. Accordingly, the shift right line 65 is energized either by a D.C. potential or by periodic pulses timed to coincide with the input pulse and with each of the "A" and "B" driver pulses. Let it also be assumed that initially all the cores are at "0" and the transistors are non-conductive.

The input pulse is applied to winding 2*a* of core 1 which is at the same time conditioned by the shift right line. Core 1 then switches, rendering transistor 13 conductive and switching cores 5 and 9 to their "1" state. This provides an output at terminals 29. It will be recognized that the operation upon switching of the core 1 is thus far identical to that of FIG. 1.

Application of the "A" driver pulse to core 9 resets the core to "0" and produces an output potential across its winding 11. This output is applied to the winding 2*a'* of the second stage of the unit at terminals 31 and at terminals 68 to the winding in the *n*th stage equivalent to the winding 61*a'* of the second stage. During the "A" driver pulse the shift right line is conditioning core 1'. The output of core 9 thereby is able to switch core 1' and the operation of the second stage proceeds in the same manner as the first stage to produce a second output at terminals 29' and to set core 9' to a "1."

During application of the "B" driver pulse to core 9', an output is developed across winding 11' which is applied to the third stage at terminals 31' and also to the first stage at winding 61*a* of core 60 at terminals 68'. Since the core of the third stage equivalent to core 1 is conditioned to shift right at that time, that stage operates in the above described fashion. The absence of shift left conditioning at core 60 renders the signal applied across winding 61*a* ineffective. As in the description of the circuit of FIG. 1, this sequence of operation repeats itself and effectively shifts a pulse along the ring from left to right, at the same time producing a series of powered outputs. As in the case of FIG. 1, two stages are required for each binary digit when the circuit is used as a shift register.

To illustrate the shift left operation, assume the core 9' to be set to a "1" and all the other cores at "0" and the transistors non-conducting. The shift left line 67 is actuated, thereby conditioning core 60 through winding 61*b* and core 60' through 61*b'*. No shift right conditioning is present. Upon application of the "B" driver pulse at terminals 34', core 9' resets to "0," generating an output which is supplied to the third stage at its equivalent of core 1 and to the winding 61*a* of core 60. Since no shift right conditioning is present, the output supplied to the third stage is ineffective. However, core 60, which is conditioned by the shift left line, now switches, generating a potential across winding 62. This potential is sufficient to render the transistor 13 conductive and the circuit operation proceeds as before to produce a powered output at terminals 29 and to set core 9 to a "1." Application of the "A" driver pulse to reset core 9 produces a pair of outputs, one of which is ineffectively supplied to core 1' of the second stage, the other of which is supplied to the next preceding stage of the ring, which is stage *n* in the case of the first stage. An output for external use may also be derived from the first stage. By extending this mode of operation to a plurality of units, it can be seen that a pulse may be shifted from right to left along the ring.

FIG. 4

Figure 4:
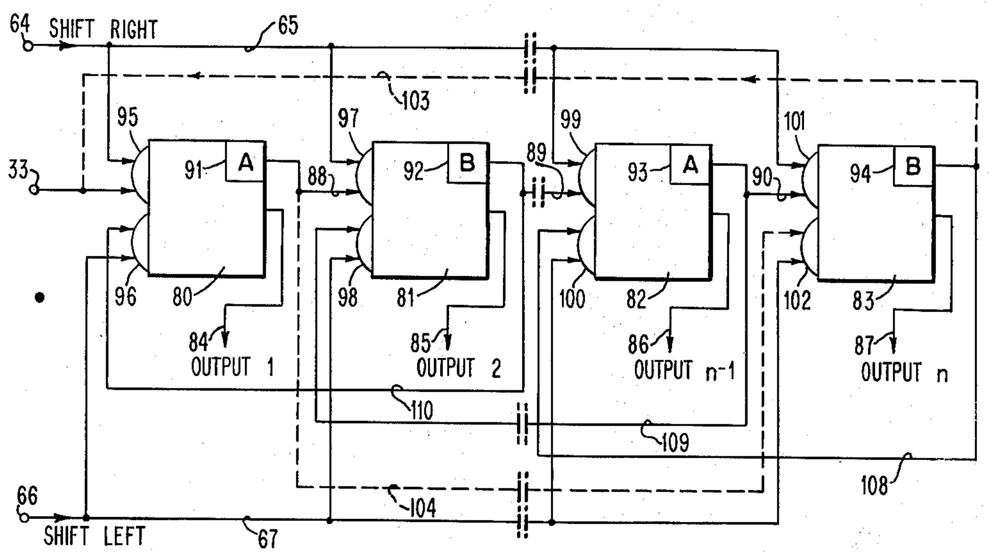
FIG. 4 is a block diagram illustrating how the units of FIG. 3 may be interconnected to form a bidirectional timing or shift ring.

In FIG. 4 there is shown a block diagram illustrating the interconnection of a plurality of pairs of the stages of FIG. 3 to form a bidirectional ring circuit. As indicated by the broken lines, any desired number of pairs of stages may be cascaded, the number of pairs being equal to the number of digits required in the shift operation. Each of the blocks 80 through 83 comprises a single stage of the ring having outputs 84 through 87 respectively. Stage 80 provides an output to its succeeding stage 81 over line 88 and to its preceding stage, which in this case is the last or nth stage of the ring, over line 104. As noted by line 104 being dotted, this connection may be omitted if repeated circulation is not desired. Block 81 provides an output to its succeeding stage over connection 89 and to its preceding stage via lead 110. Similarly stage 82 provides outputs on leads 90 and 109 to its succeeding and preceding stages respectively. Stage 83, the final stage, provides an output to its preceding stage on line 108, and if recirculation is desired, an output to the first stage 80 over line 103, shown dotted. The squares 91 through 94 in the upper right hand corners of the blocks 80 through 83 respectively, indicate the type of driving pulse supplied to the blocks. As shown, these are alternately "A" and "B." The shift right source is connected at 64 to the shift right line 65 which is coupled to each stage of the ring. Similarly, shift left signals are coupled to each stage over line 67 from terminal 66. It is to be understood that while single line representations have been used for the various connections, these connections are actually as illustrated in FIG. 4.

The circular portions or pips 95 through 102 affixed to the blocks 80 through 83 illustrate the two input requirement for operating a stage. Thus in a shift right operation, an input from 33 to 95 as well as from the shift right line 65 would be necessary to enable the block 80 to function to represent a binary "1" stored therein. In like manner, during shift left operation, an input from line 110 as well as the shift left line 67 would be required at 96 to effect operation of the circuit. Similar input requirements are indicated by the portions 97 through 102.

As is apparent from the discussion of FIG. 3, in either of the shift right or shift left conditions, operation of the ring is identical to that described in connection with FIGS. 1 and 2. By the addition of one core and several windings per stage, the basic, one-way ring has been converted to bidirectional operation, thereby greatly increasing its utility, with but a minor increase in cost. As in the case of the basic ring, two stages per bit are required for shift ring operation, but regardless of the mode of operation, a powered output is provided for each stage. It can readily be seen that, if desired, an input may be introduced into any stage of either the unidirectional or bidirectional ring. This may be accomplished, for example, by providing an added winding on the input core or cores of each stage, and would increase the versatility of the circuits.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A pulse translating ring including a plurality of stages connected in cascade, each stage comprising, first, second and third magnetic cores, each having two stable states of substantial remanence, means including an amplifying device coupled to said cores and responsive to an input pulse applied to said first core to switch all three of said cores from a first of said stable states to a second state, a source of unidirectional potential coupled to said first and second cores to return said cores to said first stable state upon termination of the input pulse, means for applying a pulse to said third core to return said core to its first stable state, and output means for said second and third cores, the output of said third core being applied as the input to the first core of the succeeding stage.

2. The pulse translating ring as defined in claim 1, wherein each of said amplifying devices comprises a transistor.

3. A storage unit for a two-stage-per-bit shift register, each of said two stages comprising, first, second and third magnetic cores, each having two stable states of substantial remanence, means including an amplifying device coupled to said cores and responsive to an input pulse applied to said first core to switch all three of said cores from a first of said stable states to a second stable state, a source of unidirectional potential coupled to said first and second cores to return said cores to said first stable state upon termination of the input pulse, means for applying a pulse during a first time interval to said third core of the first of said two stages, means for applying a pulse during a second time interval to said third core of the second of said two stages, and output means for said second and third cores of each stage, the output means of both said second cores being connected to provide outputs to external circuits and the output means of said third core of said first stage being connected to the input core of said second stage.

4. A bidirectional pulse translating ring including a plurality of stages connected in cascade, each stage comprising, a pair of input magnetic cores, a pair of output magnetic cores, each of said cores having two stable states of substantial remanence, means for selectively applying a signal to said input cores to condition said stage to transfer an input pulse applied thereto in a given direction, means including an amplifying device and responsive to the simultaneous application of a conditioning signal and an input pulse to one of said input cores to switch said one input core and said pair of output cores from a first of said stable states to a second state, unidirectional potential means coupled to said input cores and to one of said output cores to return said cores to said first stable state upon termination of the input pulse, means for applying a pulse to the other of said output cores to return said core to its first stable state, and means coupling the output of said other output core to an input core in each of its adjacent preceding and succeeding stages.

5. A pulse translating ring as defined in claim 4 above, wherein each of said input cores has a pair of input windings coupled thereto, the conditioning signal being applied to one of said windings and the input signal being applied to the other of said windings.

6. A pulse translating ring as claimed in claim 4 above, wherein the said one of said output cores in connected to provide an output to an external circuit.

7. A storage unit for a two-stage-per-bit bidirectional shift register, each of said two stages comprising, a pair of input magnetic cores, a pair of output magnetic cores, each of said cores having two stable states of substantial remanence, means for selectively applying a signal to at least one of said input cores of a given one of said two stages to condition said given stage to transfer an input pulse applied thereto in a given direction, means including an amplifying device and responsive to simultaneous application of a conditioning signal and an input pulse to one of said input cores to switch said one input core and said pair of output cores from a first of said stable states to a second state, unidirectional potential means coupled to said input cores and to one of said output cores to return said cores to said first stable state upon termination of the input pulse, means for applying a pulse during a first time interval to the other of said output cores of the first of said two stages, means for applying a pulse during a second time interval to the other of said output cores of the second of said two stages, means connected to each of the said ones of said output cores to provide separate outputs to external circuits, means connecting said other of said output cores of said first stage to provide input pulses to one of said input cores of said second stage and to an input core of a preceding stage, and means connecting said other of said output cores of said second stage to provide input pulse to one of said input cores of said first stage and to an input core of a succeeding stage.

8. The storage unit as claimed in claim 7 above, wherein said amplifying device comprises a transistor.

9. A pulse translating ring having a plurality of stages, each stage of which comprises first, second, and third magnetic cores, input and output windings associated with each of said cores, means supplying an input signal to the input winding of said first core, an amplifier having an input coupled to the output winding of said first core and an output regeneratively coupled to said first core, means connecting said amplifier output to the input windings on both said second and third cores, means including its output winding to derive an output signal from said second core in response to actuation of said amplifier, and means including its output winding to derive an output from said third core independently of operation of said amplifier.

10. A pulse translating ring having a plurality of stages, each stage of which comprises a pair of input magnetic cores, a pair of output magnetic cores, an amplifier coupling said input cores to said output cores, means coupling one of said input cores to one of the output cores of the preceding stage, means coupling the other of said input cores to one of the output cores of the succeeding stage, means coupled to both said input cores and selectively energized to render only one of said input cores operable in response to an input signal applied thereto, and means coupling one of said output cores to an input core of each of its adjacent succeeding and preceding stages.

11. The apparatus of claim 10 above, wherein the other of said output cores in connected to provide an output to an external circuit.

References Cited in the file of this patent

UNITED STATES PATENTS

| | | |
|---|---|---|
| 2,805,409 | Mader | Sept. 3, 1957 |
| 2,863,138 | Hemphill | Dec. 2, 1958 |
| 2,956,244 | Finkel et al. | Oct. 11, 1960 |